United States Patent
Nader et al.

(10) Patent No.: US 12,556,898 B2
(45) Date of Patent: Feb. 17, 2026

(54) ADAPTIVE SEGMENTATION OF PUBLIC WARNING SYSTEMS MESSAGES

(71) Applicant: Telefonaktiebolaget LM Ericsson (publ), Stockholm (SE)

(72) Inventors: Ali Nader, Malmö (SE); Gertie Alsenmyr, Vallentuna (SE); Carin Omurcali, Solna (SE); Maria Hultström, Stockholm (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 391 days.

(21) Appl. No.: 18/018,198

(22) PCT Filed: Jul. 2, 2021

(86) PCT No.: PCT/EP2021/068368
§ 371 (c)(1),
(2) Date: Jan. 26, 2023

(87) PCT Pub. No.: WO2022/022947
PCT Pub. Date: Feb. 3, 2022

(65) Prior Publication Data
US 2023/0308850 A1    Sep. 28, 2023

Related U.S. Application Data

(60) Provisional application No. 63/058,790, filed on Jul. 30, 2020.

(51) Int. Cl.
*H04W 4/90*     (2018.01)
*H04W 48/10*    (2009.01)
*H04W 76/50*    (2018.01)

(52) U.S. Cl.
CPC ............ *H04W 4/90* (2018.02); *H04W 48/10* (2013.01); *H04W 76/50* (2018.02)

(58) Field of Classification Search
CPC ........ H04W 76/50; H04W 48/10; H04W 4/90
(Continued)

(56) References Cited

U.S. PATENT DOCUMENTS

2019/0380128 A1* 12/2019 Park ................... H04W 72/21
2020/0322773 A1* 10/2020 Han ..................... H04W 4/90
2021/0352621 A1* 11/2021 Hayashi ............. H04W 48/12

FOREIGN PATENT DOCUMENTS

CN    3644653     *  2/2018    ........... H04W 48/18
EP    3644653 A1    4/2020

OTHER PUBLICATIONS

3GPP, "3rd Generation Partnership Project; Technical Specification Group Core Network and Terminals; Technical realization of Cell Broadcast Service (CBS) (Release 16)", 3GPP TS 23.041 V16.4.0, Jun. 2020, 1-100.
(Continued)

*Primary Examiner* — Maria El-Zoobi
(74) *Attorney, Agent, or Firm* — Sage Patent Group

(57) ABSTRACT

A method, in a distributed unit (DU) of a base station comprising a central unit (CU) and one or more DUs, each DU serving one or more cells, comprises sending, to the CU, information indicative of capacity in the DU for sending segmented messages and/or indicative of a capability of the DU to send segmented messages. In some embodiments, the information is indicative of capacity in the DU for sending segmented Public Warning System (PWS) messages and/or indicative of a capability of the DU to send segmented PWS messages. In some embodiments, the method further comprises receiving, from the CU, a segmented PWS message in
(Continued)

system information blocks (SIBs), each SIB carrying a segment of the PWS message, and broadcasting the SIBs.

17 Claims, 14 Drawing Sheets

(58) Field of Classification Search
USPC .................................................... 455/404.1
See application file for complete search history.

(56) References Cited

OTHER PUBLICATIONS

3GPP, "3rd Generation Partnership Project; Technical Specification Group Radio Access Network; NG-RAN; F1 application protocol (F1AP) (Release 16)", 3GPP TS 38.473 V16.2.0, Jul. 2020, 1-363.
Unknown, Author, "Clarification on CU-DU split options", 3GPP TSG RAN WG3 Meeting#93bis, R3-162344, Sophia-Antipolis, France, Oct. 10-14, 2016, 1-3.

* cited by examiner

ADAPTIVE SEGMENTATION OF PUBLIC WARNING SYSTEMS MESSAGES

TECHNICAL FIELD

The present disclosure generally relates to the field of wireless network communications, and, more particularly, to mobile alert systems.

BACKGROUND

In Long Term Evolution (LTE), there is a feature for providing Public Warning System (PWS) notifications to user equipments (UEs) that can be used to provide warning messages to users. For example, if there is an earthquake, the network can indicate this to the UEs by broadcasting PWS messages.

Likewise, in Release 15 of the specifications for 5G developed by members of the Third-Generation Partnership Project (3GPP), provision of two types of Public Warning Systems (PWS) messages is supported to the UEs in states RRC_IDLE/INACTIVE/CONNECTED, via broadcast of system information. These two types are:

Earthquake and Tsunami Warning System (ETWS) messages, which are mainly used in Japan. ETWS provides two types of warning messages. The first one "Primary Notification" is sent to indicate the type of the warning (5 different types currently defined, see 3GPP TS 23.041, section 9.3.24), then a "Secondary Notification" may be sent (typically after around 20 seconds) with the full disaster information.

Wireless Emergency Alerts (WEA), formerly known as CMAS in US, and incorporating EU-Alert and other systems all over the world. Besides ordinary warning message(s), also WEA Handset Action (WHAM) may be sent when Device-Based Geo-Fencing (DBGF) is used. The purpose of DBGF is to send geographical coordinates to the UE, so that when a UE is inside the specified area the end user will be alerted. The WHAM message is used as a reminder for the UE to recheck whether it has entered an area for which it previously received a warning message. For WEA/CMAS, many different messages can be broadcast concurrently.

The 5G system specified by 3GPP may be referred to as simply 5GS, and comprises a radio access network (RAN) and a 5G core network, often referred to as simply 5GC. The new radio access technology (RAT) supported by the 5G RAN is often referred to as "NR" (for "New Radio"); sometimes the term NR is used to refer to the RAN itself.

The 3GPP specifications for 5GS describe various network architectural options for PWS. These are depicted in FIGS. 1A, 1B, and 1C, which are provided here to provide context for the detailed discussion that follows. The details of these architectural options, which are unnecessary for a full understanding of the techniques described herein, may be found in 3GPP TS 23.041, "Technical realization of Cell Broadcast Service (CBS)." It should be appreciated, however, that the inventive concepts described herein are not limited in their application to these previously defined architectural options or even to the 5G system. 5GS is simply used here to provide a context for understanding the problems associated with delivering public warning system (PWS) messages.

The 5GS RAN includes gNodeBs (or "gNBs"), analogous to the eNodeBs (eNBs) in LTE systems. These gNodeBs may be implemented in distributed form, where a central controlling entity is in one physical node, while one or more distributed radio units can be in separate physical nodes. Thus, the architecture of a gNB may be illustrated as shown in FIG. 2, where the illustrated gNB includes a central unit (CU or gNB-CU) and at least one distributed unit (DU or gNB-DU). The The gNB-CU and gNB-DU are connected using the F1 interface, as specified in 3GPP TS 38.473, which describes procedures for interface establishment, unlocking cells, configuration updates, paging, Public Warning Systems (PWS), etc. Note that while only one DU is illustrated in the gNB shown in FIG. 2, there may be several DUs connected to a given CU. As a general matter, however, any given DU is connected to only one CU.

The transmission of a public warning message to the UEs over the Uu interface is initiated by the PWS entity, e.g., the PWS Interworking Function (PWS-IWF) or Cell Broadcast Center Function (CBCF), via a WRITE-REPLACE-WARNING-REQUEST-NG-RAN or WRITE-REPLACE-WARNING-REQUEST message (one of the messages depending on chosen architecture) over the N50/Namf interfce. This message is in turn reflected with same/similar names over the N2 interface. Upon reception of this message, the gNB-CU may, depending on the size of the Warning Message Contents, Data Coding Scheme, and Warning Area Coordinates, segment the message into a set of PWS System Information containers and provide them in WRITE-REPLACE-WARNING-REQUEST message(s) over the F1 interface to the gNB-DU. Finally, the gNB-DU will, over the Uu interface, broadcast System Information Blocks (SIBs) from which the UEs in a cell can obtain the PWS message. This signaling is illustrated in FIG. 3.

In case of a failure regarding PWS delivery in the gNB-DU, a PWS-FAILURE-INDICATION/PWS-RESTART-INDICATION message is sent to the gNB-CU. The gNB-CU forwards these messages to the Access and Mobility Management Function (AMF), which in turn forwards them to the CBCF in the network (NW). Thereby, upon receiving a FAILURE-INDICATION, the CBCF is informed that ongoing PWS operation in one, more, or all cells served by the RAN node has failed. This signaling is illustrated in FIG. 4.

As noted above, the PWS messages are provided to the UEs in a cell through the broadcast of system information (SI). SI in NR is organized as a tree, with the Master Information Block on the top containing only the most essential parameters broadcast on the Physical Broadcast Channel (PBCH). The remainder of the system information is broadcast in System Information Blocks (SIBx) contained in SI messages (except for SIB1) on the physical downlink shared channel (PDSCH). A SIB groups together Information Elements (IE) of a similar nature, i.e., including similar types of information, the same broadcast periodicity, etc.

PWS messages in particular are put by the gNB-CU into SIB6 blocks (ETWS Primary Notification), SIB7 (ETWS Secondary Notification) blocks, and SIB8 (CMAS message) blocks, respectively, depending on the nature of the PWS message. In case the gNB-CU segments the contents of given PWS message, there will be several instances of SIB7 and/or SIB8, each carrying a segment broadcast in the cell. (Here, the "term PWS message" refers to the PWS information associated with a given instance of PWS broadcast; a "PWS message" may include one or several "messages" in the conventional sense of the word "message.") The UEs distinguish between these segments through a warningMessageSegmentNumber embedded in each segment.

The SIs containing the SIBs may have different broadcast periodicities, but they are all confined to a common SI-window length (i.e., one SI-window configuration applies to all SIs). The gNB-DU may transmit the SI several times within the SI-window. Such repetition enables robust reception for UEs in poor coverage. FIG. 6 illustrates example of SI-windows for SIBs having different periodicities. As seen in the figure, the SI is transmitted several times within each window.

SUMMARY

3GPP does not specify PWS segmentation processes to be used by the gNB-CU. It is only specified that there can be a maximum of 64 segments for a PWS message and that the maximum size for a SI message (containing the SIB which contains the segment) is 2976 bits.

The segmentation process is quite important, however, since it affects provisioning of the service to the end users. Large segments (or no segmentation at all) result in large transport blocks. The larger the transport block, the more often the gNB-DU may need to repeat (to achieve high coding gain) the broadcast message within the SI-window depending on available time/frequency resources in order to guaranty service provision at cell edge. On the other hand, the smaller the segments (i.e., the more segments), the longer time it takes to deliver the complete contents of the PWS message to the UEs. Especially for PWS, it is important that UEs irrespective of their location in the cell receive a message as soon as possible.

But, the gNB-CU has to decide on its segmentation process without having insights into the internals of the gNB-DU with respect to the capacity (e.g., time/frequency resources available for SI broadcast during the SI-window) of the cells hosted by gNB-DU. This is especially problematic when there are multiple cells hosted by the gNB-DU, each with different characteristics.

Several embodiments of the techniques and apparatuses described herein address these and other problems by having the gNB-DUs provide information to the gNB-CU, to aid in the segmentation process. Some of these and other embodiments provide the gNB-DU with at least some ability to perform their own segmentations or re-segmentations of PWS messages.

An example method according to some embodiments is implemented in a distributed unit (DU) of a base station comprising a central unit (CU) and one or more DUs, each DU serving one or more cells. This example comprises sending, to the CU, information indicative of capacity in the DU for sending segmented messages and/or indicative of a capability of the DU to send segmented messages. In some embodiments, the information is indicative of capacity in the DU for sending segmented Public Warning System (PWS) messages and/or indicative of a capability of the DU to send segmented PWS messages. In some embodiments, the method further comprises receiving, from the CU, a segmented PWS message in system information blocks (SIBs), each SIB carrying a segment of the PWS message, and broadcasting the SIBs.

Another example method, also implemented in a DU of a base station comprising a CU and one or more DUs, each DU serving one or more cells, comprises sending, to the CU, at least one parameter indicating a required or recommended segmentation size for segments of messages sent to the DU. In some embodiments, the at least one parameter indicates a required or recommended segment size for segments of segmented PWS messages. In some embodiments, the method further comprises receiving, from the CU, a segmented PWS message in system information blocks (SIBs), each SIB carrying a segment of the PWS message, and broadcasting the SIBs.

Another example method is implemented in a CU of a base station comprising the CU and one or more DUs, each DU serving one or more cells. This example method comprises receiving, from at least a first DU, information indicative of capacity in the first DU for sending segmented messages and/or indicative of a capability of the first DU to send segmented messages. This example method further comprises adapting a segmentation of segmented messages in response to the information.

Still another example method is also implemented in a CU of a base station comprising the CU and one or more DUs, each DU serving one or more cells. This example method comprises receiving, from at least a first DU, at least one parameter indicating a required or recommended segmentation size for segments of messages sent to the first DU. This example method further comprises adapting a segmentation of segmented messages in response to the information.

Other embodiments described herein include apparatuses corresponding to and configured to carry out the methods summarized above, and variants thereof.

With the techniques described herein, a gNB-CU can mitigate the risk that UEs cannot receive PWS broadcast messages in some cells, e.g., those with lower capacities or capabilities. These techniques can also help ensure that PWS messages can be delivered to the UEs irrespective of a particular cell's numerology.

DETAILED DESCRIPTION

As noted above, the segmentation process for PWS messages is quite important, since it affects provisioning of the service to the end users. Large segments (or no segmentation at all) result in large transport blocks. The larger the transport block, the more often a gNB-DU may need to repeat (to achieve high coding gain) the broadcast message within the SI-window depending on available time/frequency resources in order to guaranty service provision at cell edge. On the other hand, the smaller the segments (i.e., the more segments), the longer time it takes to deliver the complete contents of the PWS message to the UEs. Especially for PWS, it is important that UEs irrespective of their location in the cell receive a message as soon as possible.

Figure 7:
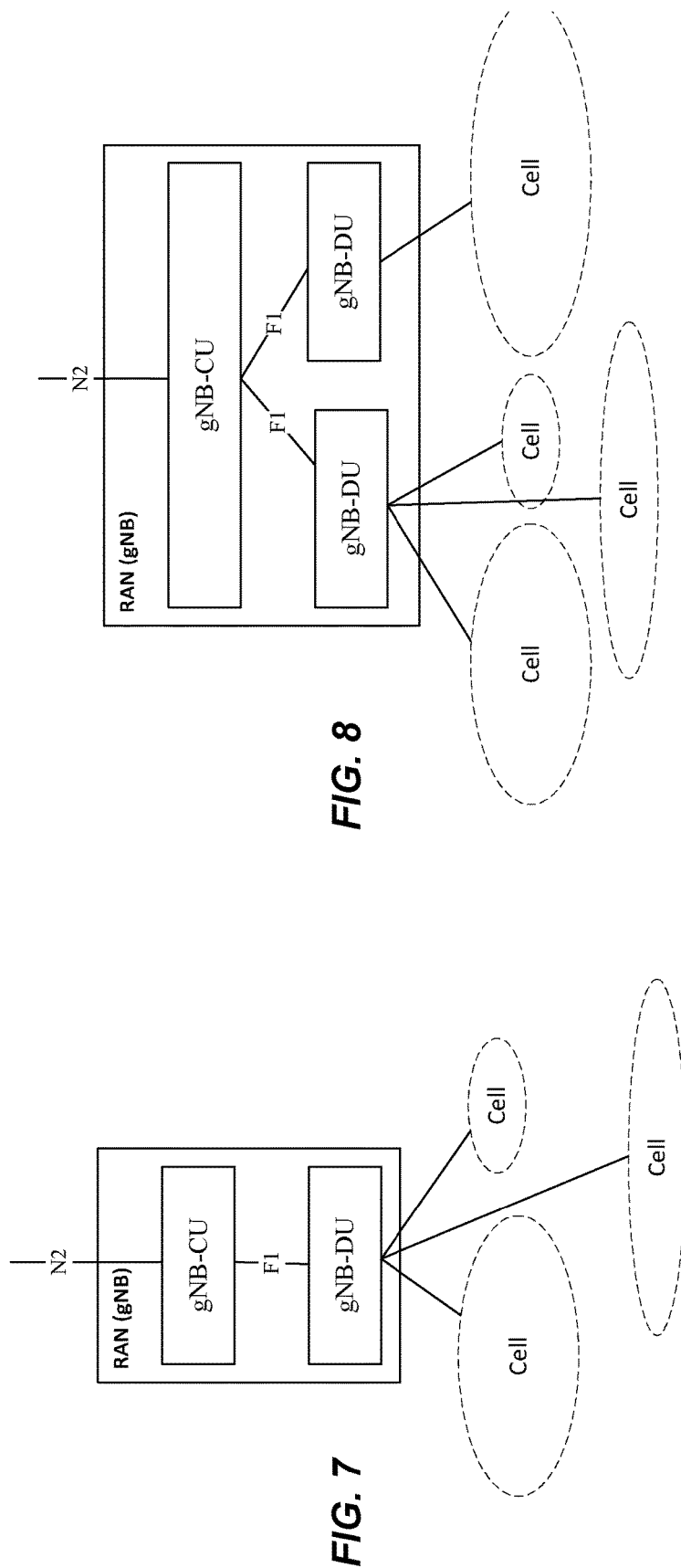
FIG. 7 illustrates a gNB-DU hosting multiple cells.

But, the gNB-CU has to decide on its segmentation process without having insights into the internals of the gNB-DU with respect to the capacity (e.g., time/frequency resources available for SI broadcast during the SI-window) of the cells hosted by gNB-DU. This is especially problematic when there are multiple cells hosted by the gNB-DU, each with different characteristics. An example of this is shown in FIG. 7, which shows a gNB-DU hosting multiple cells, each of which may different characteristics with respect to, for example, bandwidth, coverage, available time resources, etc.

Figure 8:
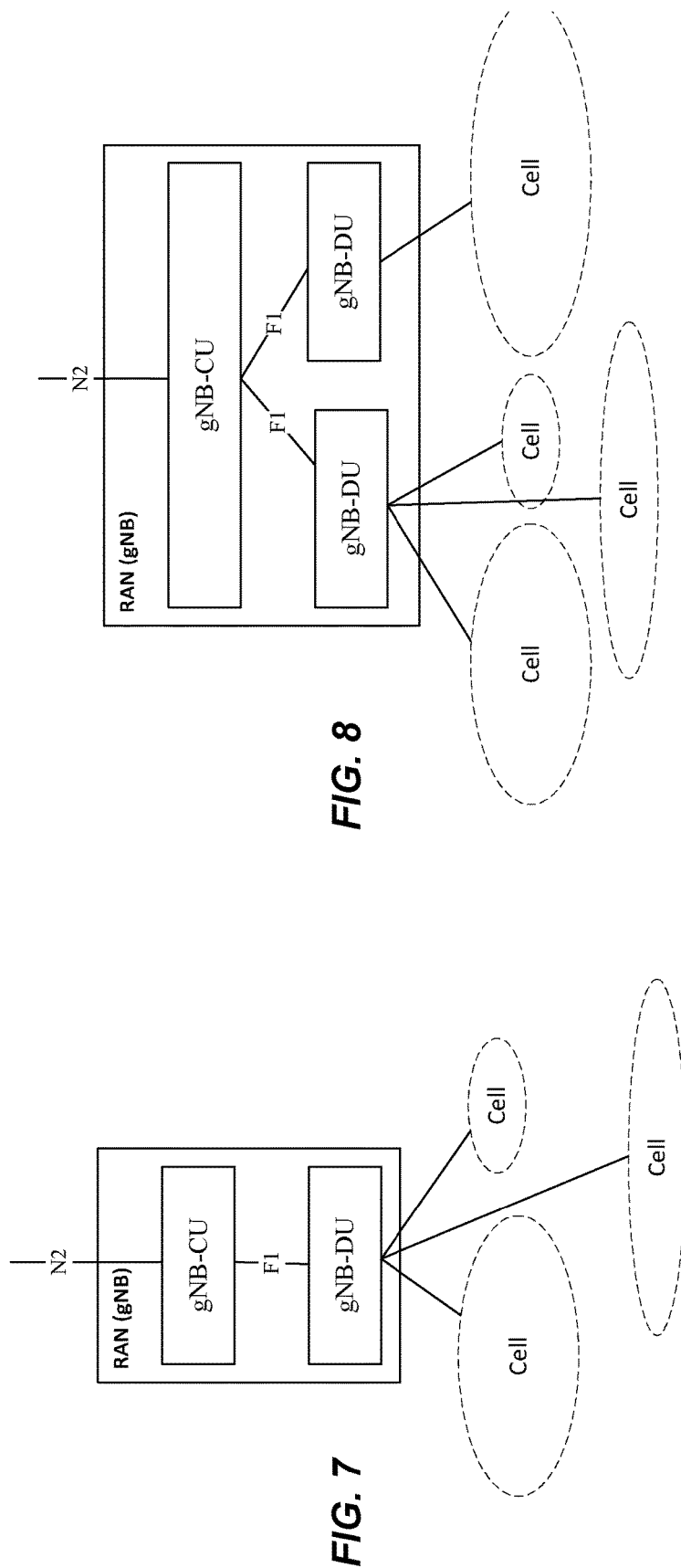
FIG. 8 illustrates a gNB-CU controlling multiple DUs.

Similarly, a given gNB-CU may be controlling/connected to multiple gNB-DUs, as shown in FIG. 8. Besides serving cells with varying characteristics, these DUs may be from different vendors, with different implementations of the 3GPP standards applicable to PWS messaging. The gNB-CU has no insight into these implementations, making an optimal segmentation even more difficult.

Still further, in the event that a NB-DU cannot meet the PWS provision requirements within a cell, due to improper gNB-CU segmentation, there is no way to inform the gNB-CU. There is today no such information in the WRITE-REPLACE WARNING RESPONSE or PWS-FAILURE-INDICATION messages. Furthermore, these messages (WRITE-REPLACE WARNING RESPONSE/PWS-FAILURE-INDICATION) are transparently forwarded throughout the network to the Cell Broadcast Center (CBC) entity, which in this case cannot know the issue and cannot affect the segmentation process within RAN.

Several embodiments of the techniques and apparatuses described herein address these and other problems by having the gNB-DUs provide information to the gNB-CU, to aid in the segmentation process. Further, some of these and other embodiments provide the gNB-DU with at least some ability to perform their own segmentations or re-segmentations of PWS messages.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The described embodiments are not limited to LTE or NR and can be adapted in other radio access technologies (RATs), such as in UTRA, LTE-Advanced, 5G, NX, NB-IoT, Wi-Fi, BLUETOOTH technologies, or in any subsequent systems by which PWS messages are provided. Further, the techniques are not necessarily limited to PWS messages, but may be applied to other system information messages or other messages that are segmented for transmission by a DU.

The techniques described herein include methods for a network to improve the gNB-CU segmentation process based on information indicating gNB-DU internals (e.g., characteristics/configuration/load). For the sake of simplicity of explanation, the examples are aimed at Public Warning System broadcast. However, it shall be noted that the methods herein also are applicable to other messages segmented by the gNB-CU (e.g., RRC messages such as UECapability Information, RRCReconfiguration, RRCResume)

In some embodiments, the gNB-DU provides information about PWS Message (SIB) capacity/capability/processing load (during an SI-window applicable to PWS SI broadcast) of each hosted cell and/or slice to the gNB-CU. This information is referred to generally herein as information indicative of the DU's capacity or ability to broadcast PWS messages (or segmented messages more broadly, or segmented messages of another type). The gNB-CU may use this information to control its message segmentation process.

Note that this information might not explicitly identify a capacity or capability, but might indirectly indicate a capacity or capability. Loading information applicable to SI broadcast, for example, indirectly indicates how much capacity is or is not available for PWS transmission. Examples of information indicating such capacity or capabilities can be information specifying available time/frequency resources, e.g., cell bandwidth, subcarrier spacing, number of available uplink/downlink resources per time unit and the like. This may be specific to the transmission of PWS messages, such that the capacity and load information is specific for the transmission of SIB messages carrying PWS information.

The information may be either general or specific to a service. For example, the gNB-DU may generally be configured to have a TDD pattern with three symbols in downlink, a certain amount of reference symbols on a periodic basis, sharing frequency/time resources with LTE, etc. This gNB-DU may provide such general information to the gNB-CU, in some embodiments. On the other hand, the gNB-DU may have set aside a certain portion of these available resources for other services, and therefore, for the sake of PWS, report PWS-specific available downlink resources. In some embodiments or instances this information might be provided on a per-cell basis, or as information that is common to all cells served by the gNB-CU, or common to a particular group of two or more cells served by the gNB-DU. (A given DU may serve only one cell, of course, in which case the information relates only to that single cell.) In some embodiments, the information may be specific to a given network slice, where a given gNB-DU might provide resources for one or several network slices.

Some examples of the information that can be reported are the following:

composite available capacity for PWS services, where the available capacity is calculated with respect to the total capacity in the cell;

PRB utilization for PWS services, where such utilization describes the amount of PRBs used for PWS message delivery;

Hardware capacity used to deliver PWS messages, with respect to the total hardware capacity available in the gNB-DU.

The information can be provided as part of a procedure from gNB-DU to gNB-CU to report capacity and load information. In other words, this information does not necessarily need to be included in existing PWS messages (although it could, in some embodiments). As an example, the information described above can be configured for reporting by the gNB-CU to the gNB-DU as part of a F1: Resource Status Request message, and it can be reported from gNB-DU to gNB-CU as part of the F1: Resource Status Update message.

At the reception of such information the gNB-CU may derive the resources available at the gNB-DU for delivery of PWS messages and it may adapt its PWS message segmentation to accommodate gNB-DU resource availability.

In some embodiments, rather than (or in addition to) providing the gNB-DU internals mentioned above (time/frequency resource details), a service-specific controlling parameter is provided to the gNB-CU for its segmentation process. For example, a "maximum segment size" can be provided to the gNB-CU for the sake of PWS segmentation. In a sub-embodiment, a set of such parameters may be provided from the gNB-DU. Example of such set could be Preferred, and/or Maximum, and/or Minimum Segment/Transport Block Size so the gNB-CU can have several choices in case there are other considerations (e.g., input from other connected gNB-DUs). As with the other information discussed above, this parameter or these parameters may be provided on a per-cell, and/or per group of cells, or per gNB-DU.

This parameter or these parameters might be provided in dedicated procedures, in some embodiments, such as the F1: gNB-DU Configuration Update or the Resource Status Update (upon previous configuration via F1: Resource Status Request). Alternatively, the parameter or parameters might be provided via PWS specific messages, in some embodiments. In one example, the parameter(s) can be provided to the gNB-CU as part of the Write Replace Warning Response, where the gNB-DU may accept the segmentation formatting from the gNB-CU received in the first Write Request Warning Request, but where the gNB-DU may recommend the gNB-CU to adopt a particular segmentation or a segmentation in a preferred range, as described above, for future PWS message transfers.

Alternatively, the parameter(s) can be included in the PWS Failure Indication, in some embodiments. In this case, there may also be signaling, as part of the PWS Failure Indication from the gNB-DU, of an indication that the failure is due to unsuitable segmentation, e.g., too large segments. The gNB-DU may also indicate the preferred segmentation so that the gNB-CU can segment accordingly in future PWS message deliveries.

For either types of information described above (i.e., information indicative of the DU's capability or capacities or parameter(s) indicating a preferred or required segmentation), the information may be provided initially, during a setup of the connection between the gNB-CU and gNB-DU, and/or dynamically upon changes in gNB-DU. In the latter case, the gNB-DU may update the gNB-CU via the configuration update procedures. Alternately or in addition, the information may be provided first upon specific request from gNB-CU, e.g., upon WRITE-REPLACE WARNING REQUEST in which the number of segments and/or segment sizes are not seen as optimal by the gNB-DU (e.g., too small segments delaying the service, or too large segments not possible to broadcast with full coverage). In these embodiments, the gNB-DU may provide the information/parameters in a response (WRITE-REPLACE WARNING RESPONSE) to the request.

In any of the embodiments above, the gNB-CU may use the information/parameters to control its segmentation process. The gNB-CU may adapt the segmentation exactly to the characteristics of each individual cell in the gNB-DU(s), for example. Alternately, the gNB-CU may consider the cell-specific information but still adapt its segmentation process to commonly serve all/group of cells. For instance, the gNB-CU may receive information from several cells with different information (or even from multiple gNB-DUs), but for simplicity, or for the sake of wanting all UEs to receive the information at roughly the same time, choose to perform segmentation according to the information suited for the least capable cell, e.g., using the smallest among all proposed segment sizes.

In a further aspect, in some embodiments the PWS-FAILURE-INDICATION/PWS-RESTART-INDICATION messages may be extended such that the gNB-DU can provide said information. In these embodiments, in the event that the segment size is the reason behind the failure, or if the gNB-DU has changed configuration after restart, and the said information is included, the gNB-CU could, instead of transparently relaying the message, act on it. Thus, for example, the gNB-CU could, upon failure, retry with a new segment size before giving up on the gNB-DU.

In one aspect of the present techniques, the gNB-CU does not or cannot accept or follow gNB-DU recommendations. This can happen, for instance, as a result of gNB-CU not understanding the said information (e.g., in a gNB-CU using an older release of software), or not wanting to follow the recommendation from gNB-DU for any other reason. This can be learned by the gNB-DU either based on handshaking the acceptance of the parameter (e.g., in GNB-DU CONFIGURATION UPDATE ACKNOWLEDGE or alike), and/or based on segment sizes included in successive WRITE-REPLACE-WARNING-REQUEST(s), and/or based on lack of action/response from gNB-CU (e.g., no new response from gNB-CU after some timeout). In some embodiments, the gNB-DU in such a situation may adapt itself to be able to provide the PWS broadcast even though the segment sizes are not optimal/possible with current configuration. In one aspect this adaptation can done by the gNB-DU already upon the request from the gNB-CU while awaiting and until action is taken by the gNB-CU, so that the provision of service is not delayed. This adaptation may include one or several of:

increasing the SI-Window, thereby still being able to provide the service but with longer delay. Note that this has an effect on all system information due to a common SI-window configuration applicable to all SIs and include a System information update procedure for changing all broadcast.

increasing (or otherwise changing) the bandwidth of the cell and/or changing the numerology (sub-carrier spacing).

turning on another cell (coverage cell) that is capable of providing such service with the given configurations.

taking time/frequency resources from another system sharing the resources (e.g., taking LTE resources in the case of spectrum sharing).

informing the operator that the above/other configuration of gNB (-DU or -CU) needs to be changed to be able to provide the service.

In the techniques described above, the gNB-CU may adapt its segmentation of PWS messages based upon information/parameters provided to it by the gNB-DU. In some embodiments, the gNB-DU may perform a segmentation (or re-segmentation of existing segments) of PWS messages. In some circumstances, for example, it may be useful to delegate this segmenting responsibility to one or several DUs connected to a given CU.

In some of these embodiments, then, upon receiving a badly segmented message from the gNB-CU, the gNB-CU might also receive from the gNB-CU an indication that the gNB-DU can apply the most suitable segmentation for transmission of the message. This indication might be associated with a particular PWS message, or might apply more broadly to all PWS messages. In these embodiments, the gNB-DU will be responsible to segment the PWS message and send it over the air to best suit its resource conditions.

A specific indication from the gNB-CU to gNB-DU indicating that the gNB-DU is responsible of segmentation is needed because fully autonomous gNB-DU segmentation can only apply when a given PWS message is broadcast only in cells belonging to the gNB-DU. In other words, if the message was broadcast in cells belonging to different gNB-DUs, the gNB-DUs would need to be coordinated in terms of type of segmentation to adopt, therefore achieving the same segmentation across all cells where the message is broadcast.

In this latter case, coordination amongst gNB-DUs may be achieved, in some embodiments, by the gNB-CU signaling to each gNB-DU an indication of the type of segmentation that needs to be applied. Each gNB-DU receiving this information will apply the segmentation and broadcast the various PWS message segments. The segmentation information in this case may specify the segment size that needs to be used when segmenting the PWS message.

The techniques described above may be employed to enable efficient provision of a service in which there is a gNB-CU/gNB-DU interaction and where the format of the data (e.g., segmentation of data) decided in the gNB-CU has dependency to the internals of the gNB-DU. For the sake of description, the focus is put on Public Warning System (PWS) where the gNB-CU performs segmentation of the messages which has a dependency and impact on the gNB-DU internal processing. The gNB-CU can perform optimal segmentation of PWS message based on gNB-DU capabilities and capacity of gNB-DU hosted cells.

The various techniques described above may be summarized as embodiments of or combinations of the following six methods:

A) A method for the gNB-DU to provide information related to its capacity and/or capabilities and/or operational performance relative to message segmentation process (such as for PWS processes) to the gNB-CU, whereby the gNB-CU may use said information/recommendation to control its message segmentation process.
  a) The method A) above where the said capacity/capability is one or several of cell/slice time/frequency resources (cell bandwidth, subcarrier spacing, number of available uplink/downlink resources per time unit) used by the gNB-DU for provision of the services requested/controlled by the gNB-CU.
  b) The method A) above where the said operational performance is one or several of gNB-DU internal processing load, and/or gNB-CU requested service provision latency, and/or other ongoing gNB-DU internal/externally-requested services latency.
  c) The methods above where the said gNB-CU controlled service is Public Warning Systems broadcast.
  d) The methods above where a/set of parameters (relevant to the gNB-CU controlled service) derived from the said information of a) and b) is instead (instead of the source information) provided from the gNB-DU to the gNB-CU.
  e) The parameter(s) of d) is implemented as a Preferred, and/or Maximum, and/or Minimum Segment/Transport Block Size.
  f) The parameter(s) of e) are provided per cell hosted by the gNB-DU (i.e., cell-specific).
  g) The gNB-DU derives one common set of parameters of e) suitable for all/group of its cells and provides it to the gNB-CU (i.e., gNB-DU-specific).
B) A method for the gNB-CU where the information/recommendations of A), (including the variations in (a)-(g), is used for controlling the number of segments and message segment size(s) used for requesting a service from gNB-DU.
  a) The method of B) where the gNB-CU performs segmentation of the message that is to be provided over the air via the gNB-DU such that all/some of segment size(s) matches exactly the information provided by the gNB-DU.
  b) The method of B) where the segment size does not match the information provided by the gNB-DU. E.g., the gNB-CU might consider other input from other gNB-DUs or other internal/external considerations.
  c) The methods of a) or b) where the gNB-CU adapts the segmentation process per cell or group of cells within the gNB-DU (i.e., cell-specific or cell-group-specific).
  d) The methods above where the gNB-CU adapts the segmentation process per gNB-DU or group of gNB-DUs hosted by the gNB-CU (i.e., gNB-specific or gNB-group-specific).
C) The methods A) and B) where the information exchange and/or the segmentation control process are updated dynamically when the conditions in gNB-CU and/or gNB-DU change.
  a) The information exchange can be included in CONFIGURATION-UPDATE procedures over the F1 interface.
  b) The information exchange can be included in F1-SETUP procedures over the F1 interface.
  c) The information exchange can be included in PWS-RESTART-INDICATION (e.g., when the operator has changed the configuration of gNB-DU during the restart)
  d) The information exchange can be included in RESOURCE-STATUS-REQUEST/UPDATE procedures over the F1 interface.
D) The methods A) and B) where the information is included in PWS-FAILURE-INDICATION in response to a WRITE-REPLACE WARNING-REQUEST
  a) Whereby the gNB-CU does not transparently and immediately forward the message to AMF, but rather adapts the segmentation and retries with a (set of) new WRITE-REPLACE WARNING-REQUEST(s)
E) The methods A) to C) where the gNB-CU does not/cannot accept/follow gNB-DU recommendations whereby the gNB-DU needs to take actions/adapt to the gNB-CU.
  h) Where the adaptation can be one/several of:
    increasing SI-Window (thereby still being able to provide the service but with longer delay).

Increasing bandwidth of the cell and/or changing the numerology (sub-carrier spacing).

turning on another cell (coverage cell) that is capable of providing such service with the given configurations.

taking time/frequency resources from another system sharing the resources (e.g., taking LTE resources in the case of spectrum sharing).

informing the operator that the above/other configuration of gNB (-DU or -CU) needs to be changed to be able to provide the service.

F) A method in which the gNB-CU signals to gNB-DU information guiding the gNB-DU on the type of segmentation the gNB-DU should apply to a specific RRC message (e.g., PWS messages) and where the gNB-DU segments the PWS message and broadcast it over the air.

Following are descriptions of specific apparatuses and generalized methods reflecting embodiments of the techniques described above. It should be appreciated that while the description below may in some instances use generalized language or terminology that varies from the examples and description above, it is intended that all of the techniques described above are encompassed by the methods described below. Thus, minor variations in terminology should be understood as being equivalent to or encompassing similar terms used above, depending on the context.

Figure 9:
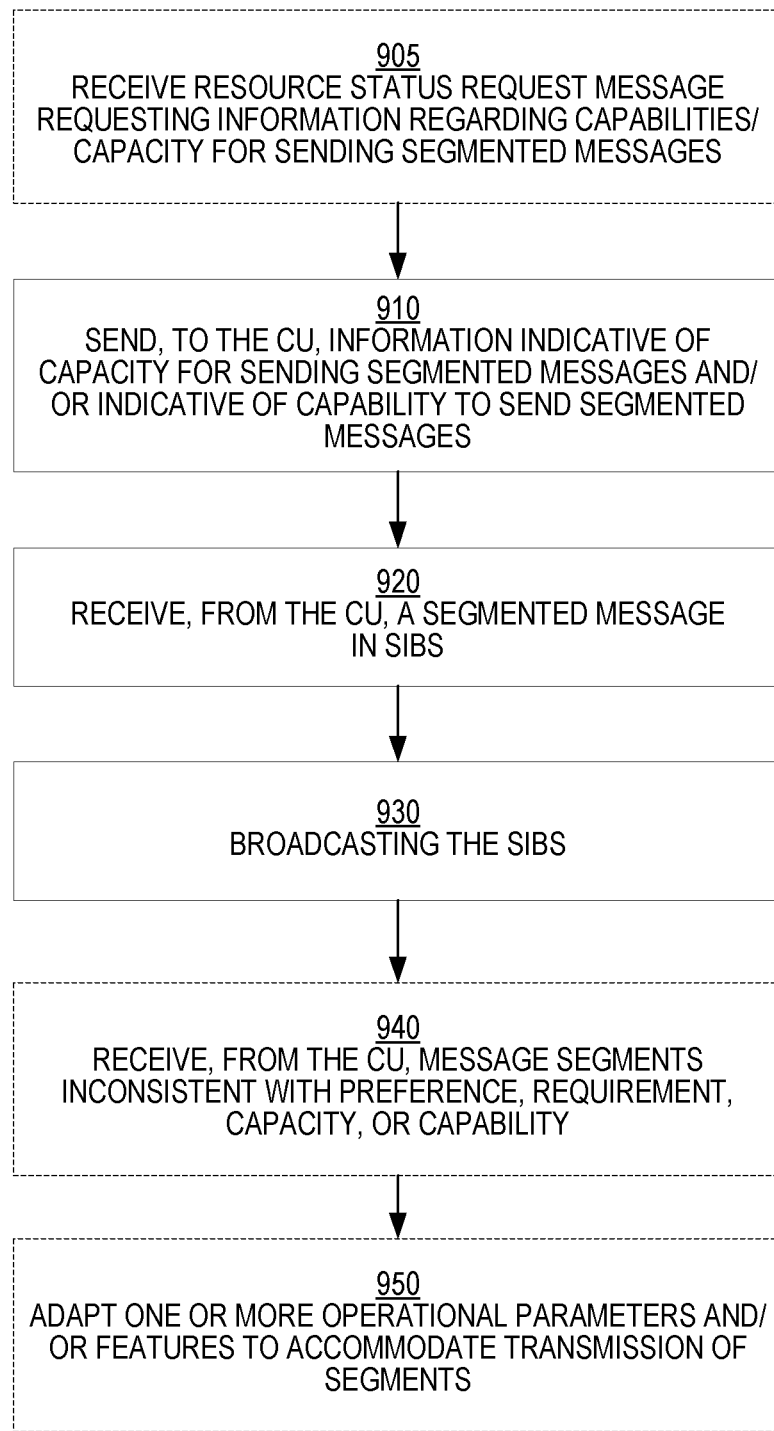
FIG. 9 and FIG. 10 each illustrate an example method as carried out in a DU.

First, FIG. 9 illustrates an example method, according to several of the techniques described above, as implemented in a distributed unit (DU) of a base station that comprises a central unit (CU) and one or more DUs, where each DU serves one or more cells. The method comprises, as shown at block 910, the step of sending, to the CU, information indicative of capacity in the DU for sending segmented messages and/or indicative of a capability of the DU to send segmented messages. As noted above, information of capacity in the DU may comprise load information, available resource information such as cell bandwidth, subcarrier spacing, number of time resources, etc.

In some embodiments, the information is indicative of capacity in the DU for sending segmented Public Warning System (PWS) messages and/or indicative of a capability of the DU to send segmented PWS messages, although it should be understood that the illustrated method may encompass the processing of other sorts of segmented messages.

Figure 1A:
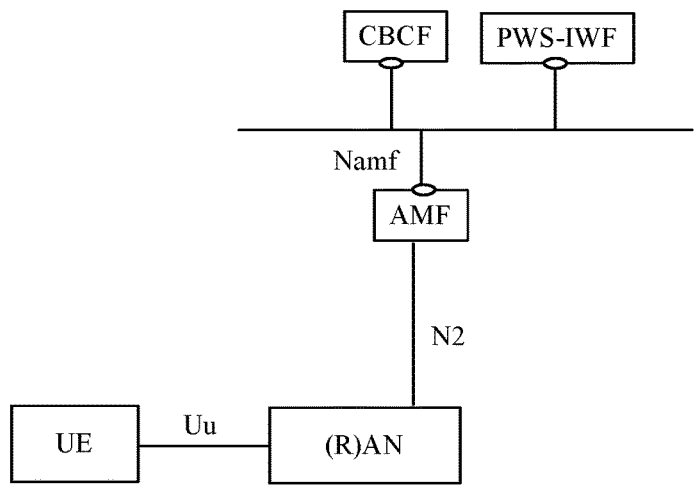
FIGS. 1A, 1B, and 1C illustrate network architectural options for the provision of PWS messages.
Figure 1B:
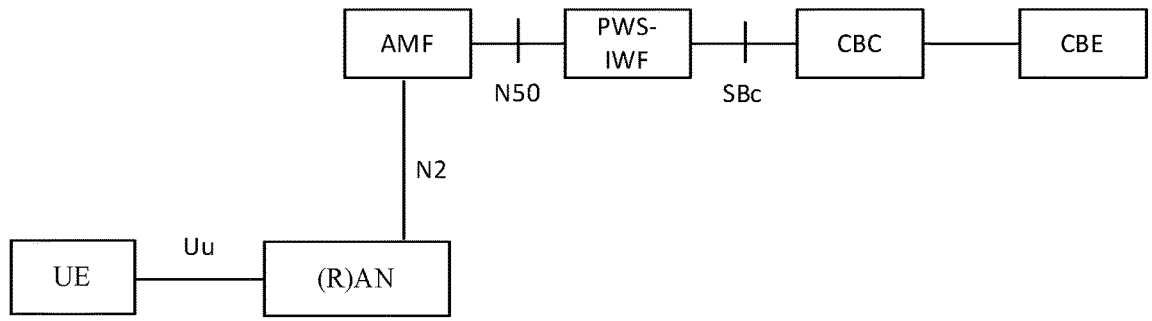
Figure 1C:
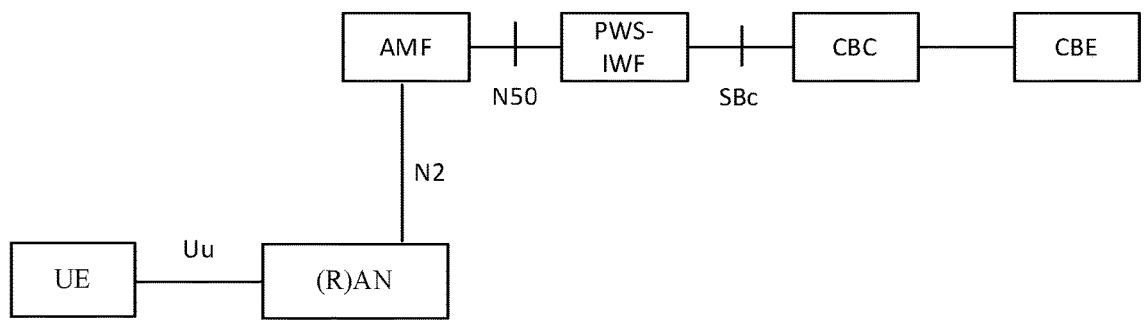
Figure 2:
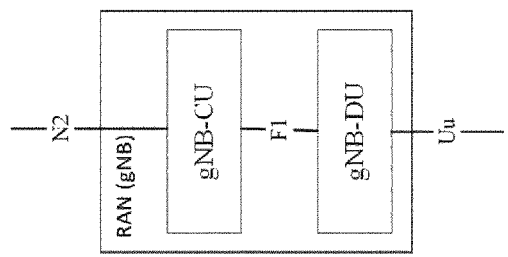
FIG. 2 illustrates the architecture of an example gNB.
Figure 3:
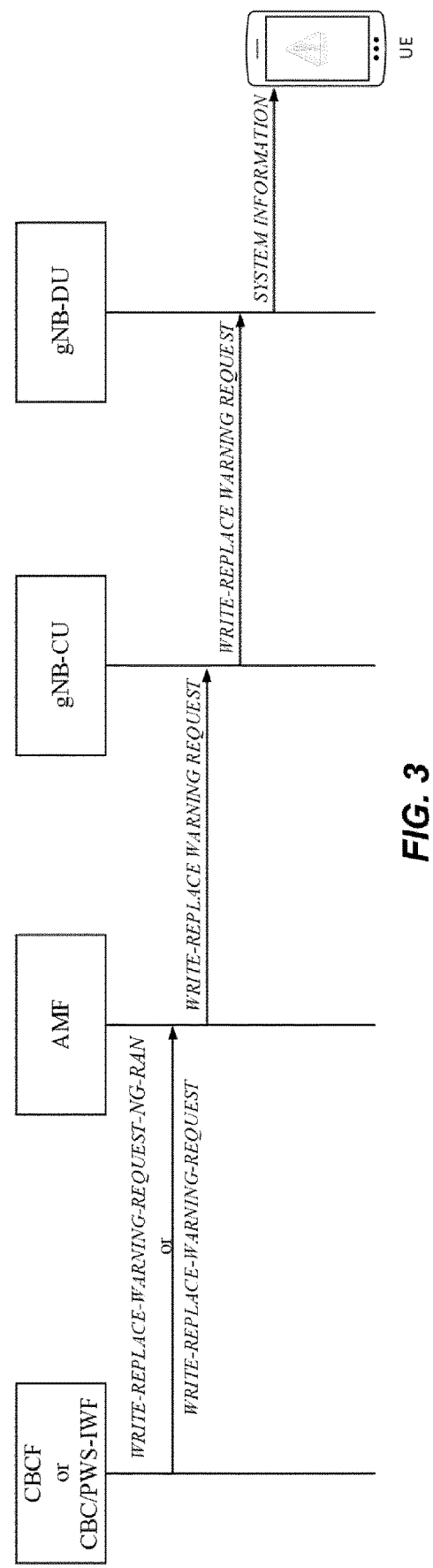
FIG. 3 shows example signaling of a PWS message, in a 5G system.
Figure 4:
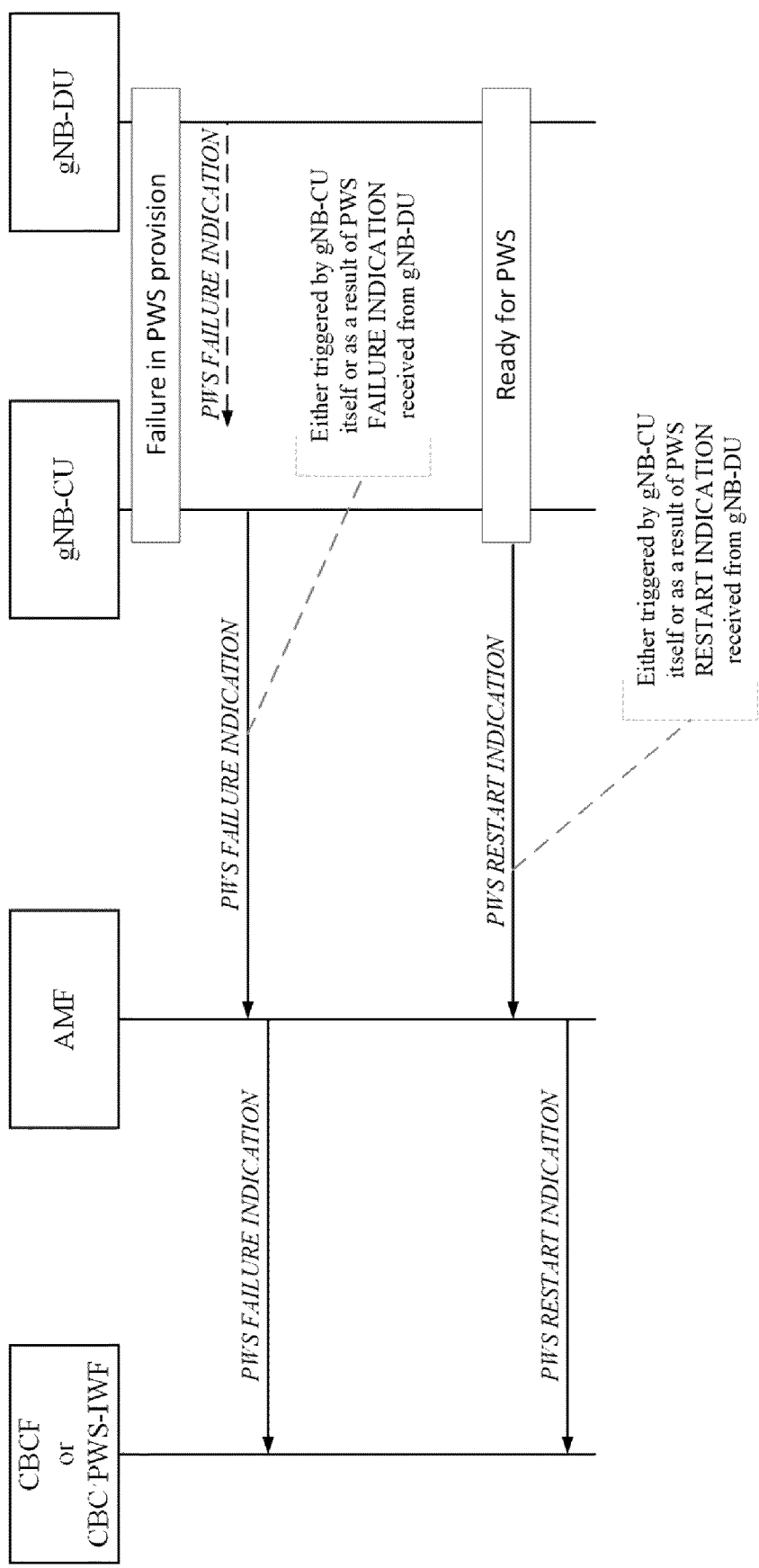
FIG. 4 shows signaling associated with PWS failure in a gNB-DU.
Figure 5:
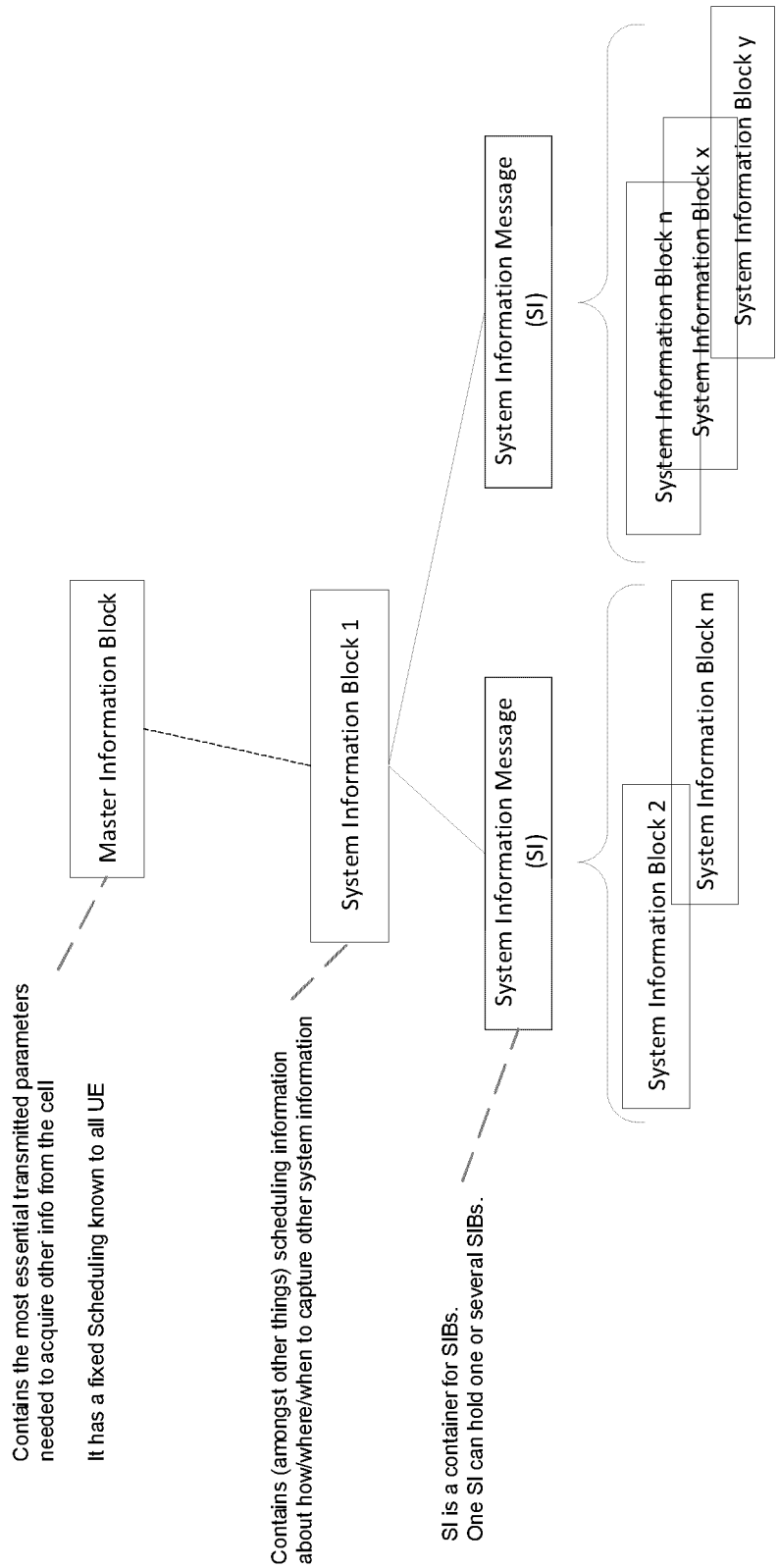
FIG. 5 illustrates the types of and relationships between system information blocks (SIBs).
Figure 6:
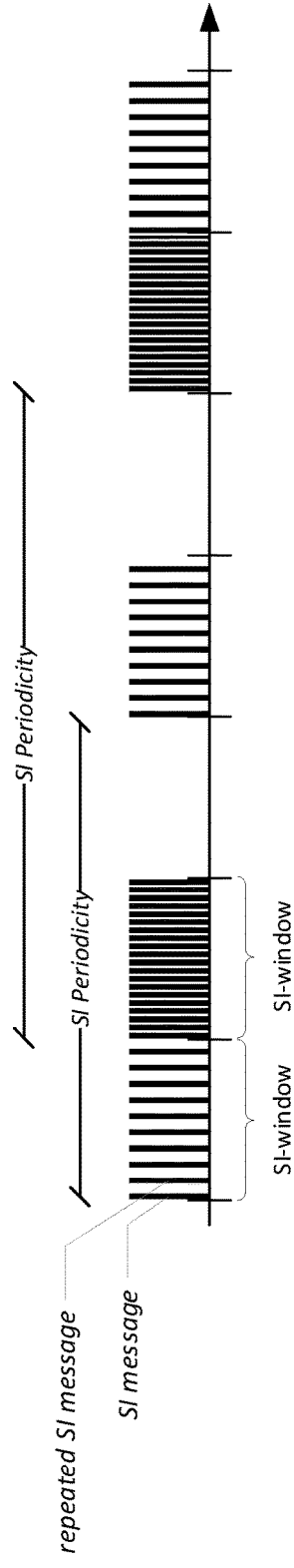
FIG. 6 illustrates SI-windows for SIBs having different periodicities.

In some embodiments, the method further comprises the steps of receiving, from the CU, a segmented message, such as a segmented PWS message, in system information blocks (SIBs), each SIB carrying a segment of the message, and broadcasting the SIBs. These are shown at blocks 920 and 930 in FIG. 3.

In some of the embodiments encompassed by the example method shown in FIG. 9, the information sent by the DU to the CU corresponds to a single cell served by the DU. In some embodiments, this information is specific to each of two or more cells served by the DU. In other embodiments, all or parts of the information may be common for two or more cells served by the DU. In any of these embodiments, the information may be specific to one of two or more network slices supported by the DU.

In some embodiments, the method comprises receiving a resource status request message requesting all or part of the information. This is shown in FIG. 9 at block 905. In these embodiments, the information sent by the DU is included in a resource status update message.

Figure 10:
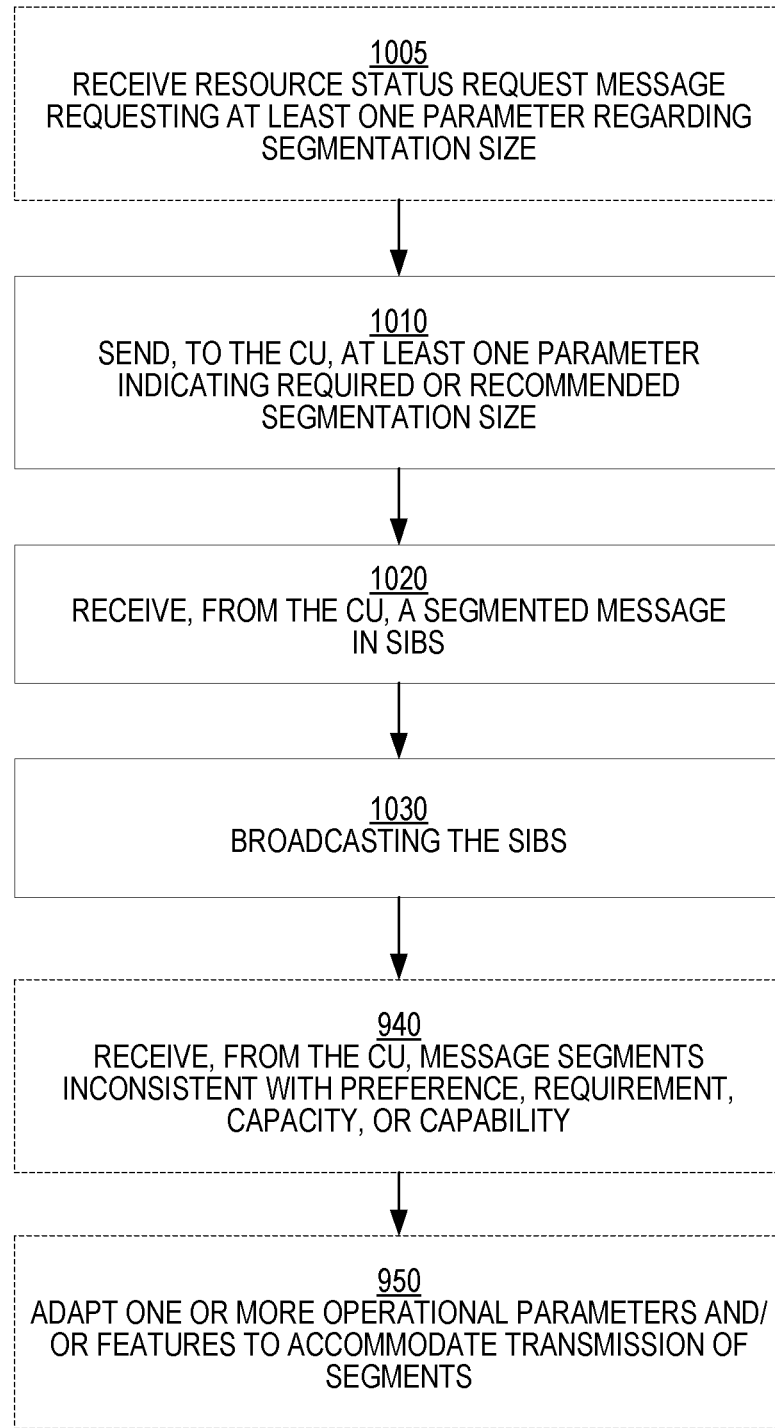

FIG. 10 illustrates another example method, again as implemented in a DU of a base station comprising a CU and one or more DUs, each DU serving one or more cells. This method may be an alternative to the method of FIG. 9, or combined with it, in various embodiments.

As shown at block 1010, the method comprises the step of sending, to the CU, at least one parameter indicating a required or recommended segmentation size for segments of messages sent to the DU. In some embodiments, this at least one parameter indicates a required or recommended segment size for segments of PWS messages.

As shown at block 1020, the method may further comprise receiving, from the CU, a segmented message, such as a segmented PWS message, in system information blocks (SIBs), each SIB, carrying a segment of the message. The method then further comprises broadcasting the SIBs, as shown at block 1030.

In various embodiments, the at least one parameter may indicate one or more of the following: a maximum segment or transport block size; at least one preferred segment or transport block size; and a minimum segment or transport block size. In some embodiments, the at least one parameter indicates a segment size or transport block size, or range thereof, that is not supported.

As was the case with the information discussed above in connection with FIG. 9, the at least one parameter sent to the CU by the DU in the method of FIG. 10 may correspond to a single cell served by the DU. In some embodiments, the at least one parameter is specific to one of two or more cells served by the DU. In other embodiments, the at least one parameter may be common to two or more cells served by the DU. In some of any of these embodiments, the at least one parameter may be specific to a network slice, i.e., to one of two or more slices served by the DU.

In some embodiments, the method may comprise receiving a resource status request message requesting the at least one parameter. This is shown at block 1005. In these embodiments, the at least one parameter may be included in a resource status update message.

In other embodiments, the method comprises receiving a Write-Replace Warning Request message and responding to the Write-Replace Warning Request message with a Write-Replace Warning Response message that includes the at least one parameter. In still other embodiments, the method may comprise receiving a Write-Replace Warning Request message and responding to the Write-Replace Warning Request message with a PWS Failure Indication message that includes the at least one parameter. In some of these latter embodiments, the PWS Failure Indication message may further include an indication that a PWS transmission failed due to unsuitable segmentation.

In some embodiments, the method comprises sending the at least one parameter to the CU during a connection setup procedure with the CU.

In some embodiments of the methods illustrated in both FIGS. 9 and 10, the DU may be further configured to deal with the receiving of message segments that are not optimal for the DU. In some embodiments, then, either of the methods shown in FIGS. 9 and 10 may further comprise receiving, from the CU, one or more message segments, e.g., PWS message segments, inconsistent with a preference, requirement, capacity, or capability of the DU. This is shown at blocks 940 and 1040 in FIGS. 9 and 10. The methods in these embodiments may further comprise the step of adapting one or more operational parameters or features of the DU to accommodate transmission of the one or more segments, as shown at blocks 950 and 1050 of FIGS. 9 and 10.

This adapting may comprise any one or more of the following, for example: changing a system information (SI)

window size, e.g., to increase it; changing a bandwidth of a cell served by the DU; changing a sub-carrier spacing used by a cell served by the DU; turning on an additional cell controlled by the DU; and shifting time-frequency resources from another radio access technology sharing spectrum resources.

In one particular example, the method of either FIG. 9 or FIG. 10 may include receiving, from the CU, one or more segments, such as PWS message segments, inconsistent with a preference, requirement, capacity, or capability of the DU, as shown at blocks 940 and 1040, as well as receiving an indication from the CU that the DU may segment PWS messages. In these embodiments, the adapting may comprise resegmenting the one or more message segments, e.g., PWS segments, for transmission.

Figure 11:
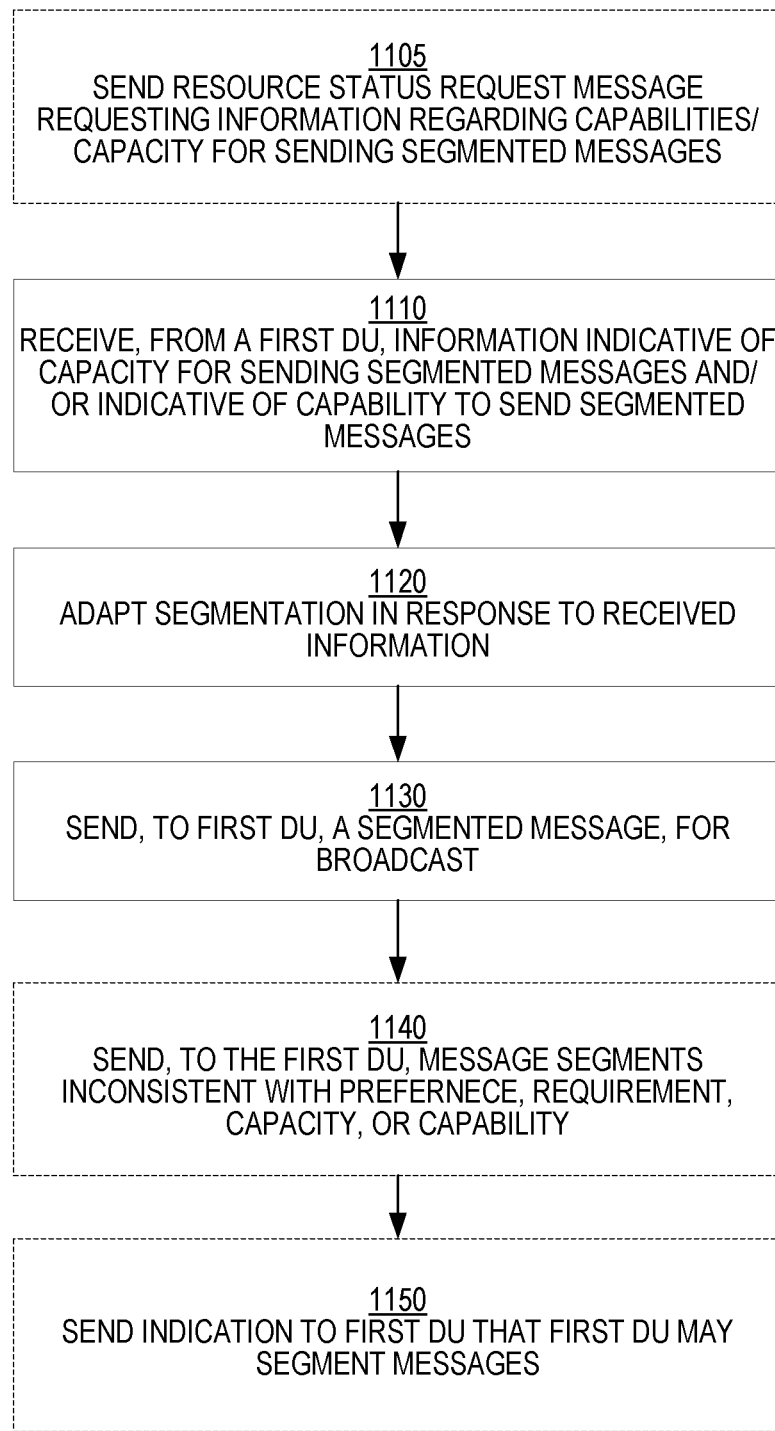
FIG. 11 and FIG. 12 each illustrate an example method as carried out in a CU.

FIG. 11 illustrates an example method complementing the method of FIG. 9, with the method of FIG. 11 being implemented in a CU of a base station comprising the CU and one or more DUs, again where each DU serves one or more cells. As shown at block 1110, the method comprises receiving, from at least a first DU, information indicative of capacity in the first DU for sending segmented messages and/or indicative of a capability of the first DU to send segmented messages. As shown at block 1120, the method further comprises adapting a segmentation of segmented messages in response to the information. In some embodiments, the information is indicative of capacity in the first DU for sending segmented Public Warning System (PWS) messages, in particular, and/or indicative of the capability of the first DU to send segmented PWS messages. In these embodiments, the adapting comprises adapting a segmentation of PWS messages in response to the information.

In some embodiments, the method may further comprise sending, to at least the first DU, a segmented message, such as a segmented PWS message, in system information blocks (SIBs), each SIB carrying a segment of the PWS message, for broadcast. This is shown at block 1130 in FIG. 11.

In some embodiments, the information received from the first DU corresponds to a single cell served by the first DU. In some embodiments, the information is specific to each of two or more cells served by the first DU. In some embodiments, all or part of the information is common for two or more cells served by the first DU. In any of these embodiments, the information may be specific to one of two or more network slices.

In some embodiments, the method may comprise sending a resource status request message requesting all or part of the information, as shown at block 1105. In these embodiments, the information may be included in a resource status update message received from the first DU.

Figure 12:
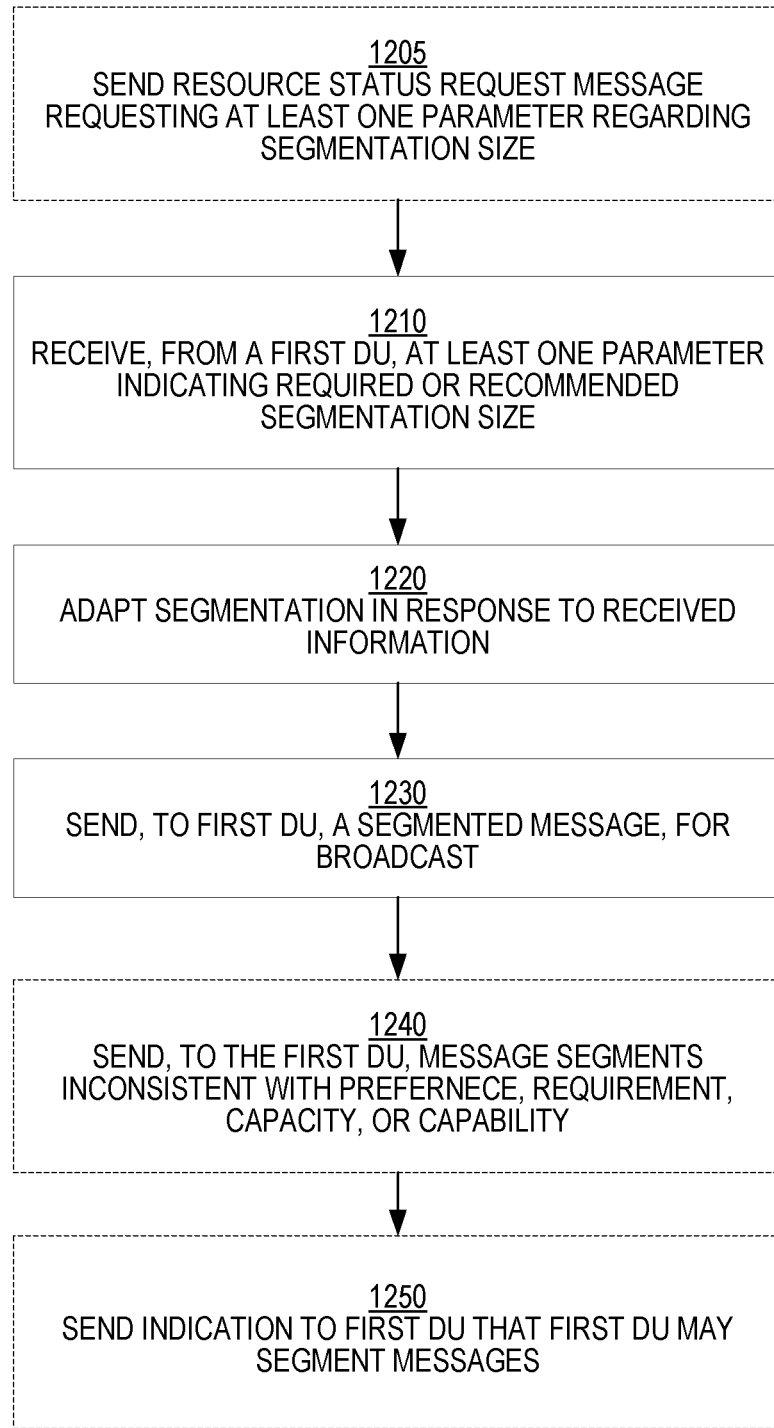

FIG. 12 similarly shows a method complementing that of FIG. 10, as implemented in a CU of a base station comprising the CU and one or more DUs, each DU serving one or more cells. As shown at block 1210, the method comprises receiving, from at least a first DU, at least one parameter indicating a required or recommended segmentation size for segments of messages sent to the first DU. As shown at block 1220, the method comprises adapting a segmentation of segmented messages in response to the at least one parameter. In some embodiments, the at least one parameter indicates a required or recommended segment size for segments of Public Warning System (PWS) messages, specifically. In some embodiments, the method further comprises sending, to at least the first DU, a segmented message, such as a PWS message, in system information blocks (SIBs), each SIB carrying a segment of the segmented message, for broadcast. This is shown at block 1230.

In various embodiments, the at least one parameter may indicate one or more of the following: a maximum segment or transport block size; at least one preferred segment or transport block size; and a minimum segment or transport block size. In some embodiments, the at least one parameter indicates a segment size or transport block size, or range thereof, that is not supported.

As was the case with the information discussed above in connection with FIG. 11, the at least one parameter received by the CU from the first DU in the method of FIG. 12 may correspond to a single cell served by the first DU. In some embodiments, the at least one parameter is specific to one of two or more cells served by the first DU. In other embodiments, the at least one parameter may be common to two or more cells served by the first DU. In some of any of these embodiments, the at least one parameter may be specific to a network slice, i.e., to one of two or more slices served by the first DU.

In some embodiments, the method may comprise sending a resource status request message requesting the at least one parameter. This is shown at block 1205. In these embodiments, the at least one parameter may be included in a resource status update message.

In other embodiments, the method comprises sending a Write-Replace Warning Request message and receiving, in response, a Write-Replace Warning Response message that includes the at least one parameter. In still other embodiments, the method may comprise sending a Write-Replace Warning Request message and receiving, in response, a PWS Failure Indication message that includes the at least one parameter. In some of these latter embodiments, the PWS Failure Indication message may further include an indication that a PWS transmission failed due to unsuitable segmentation.

In some embodiments, the method comprises receiving the at least one parameter from the first DU during a connection setup procedure with the first DU.

As noted above in connection with FIGS. 9 and 10, in some embodiments the DU may be further configured to deal with the receiving of message segments that are not optimal for the DU. In some embodiments, then, either of the methods shown in FIGS. 11 and 12 may further comprise sending, to the first DU, one or more PWS segments inconsistent with a preference, requirement, capacity, or capability of the DU. This is shown at blocks 1140 and 1240 in FIGS. 11 and 12, respectively. These methods may further comprise, as shown at blocks 1150 and 1250 in FIGS. 11 and 12, sending an indication to the first DU that the first DU may segment PWS messages.

Figure 13:
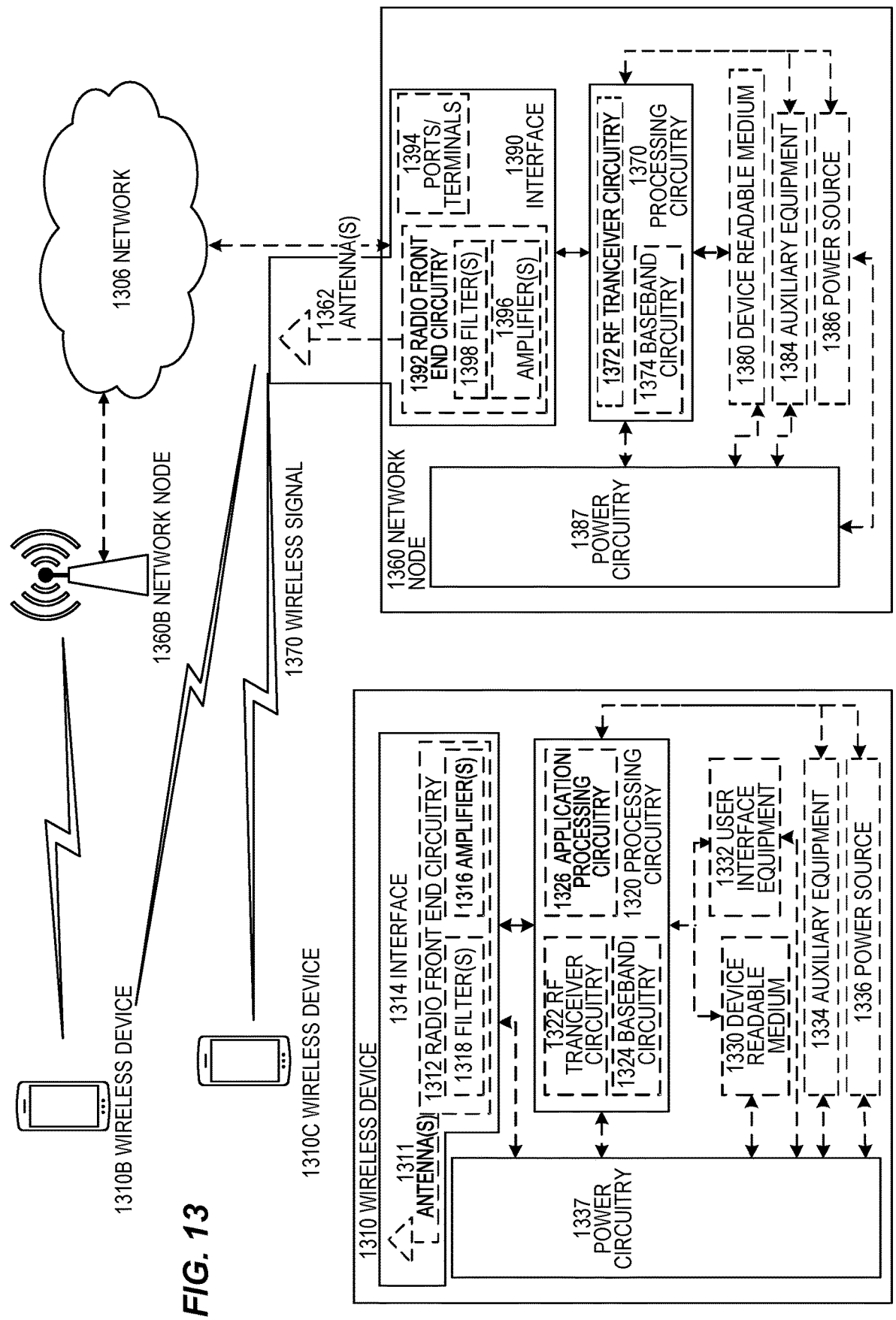
FIG. 13 illustrates components of an example wireless network.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360B, and WDs 1310, 1310B, and 1310C. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. It should be noted that the functionality of network node 1360 may be split between two or more physical nodes, such as according to the CU and DU functionality discussed above; this is illustrated in further detail in subsequent figures. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387.

As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316.

Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
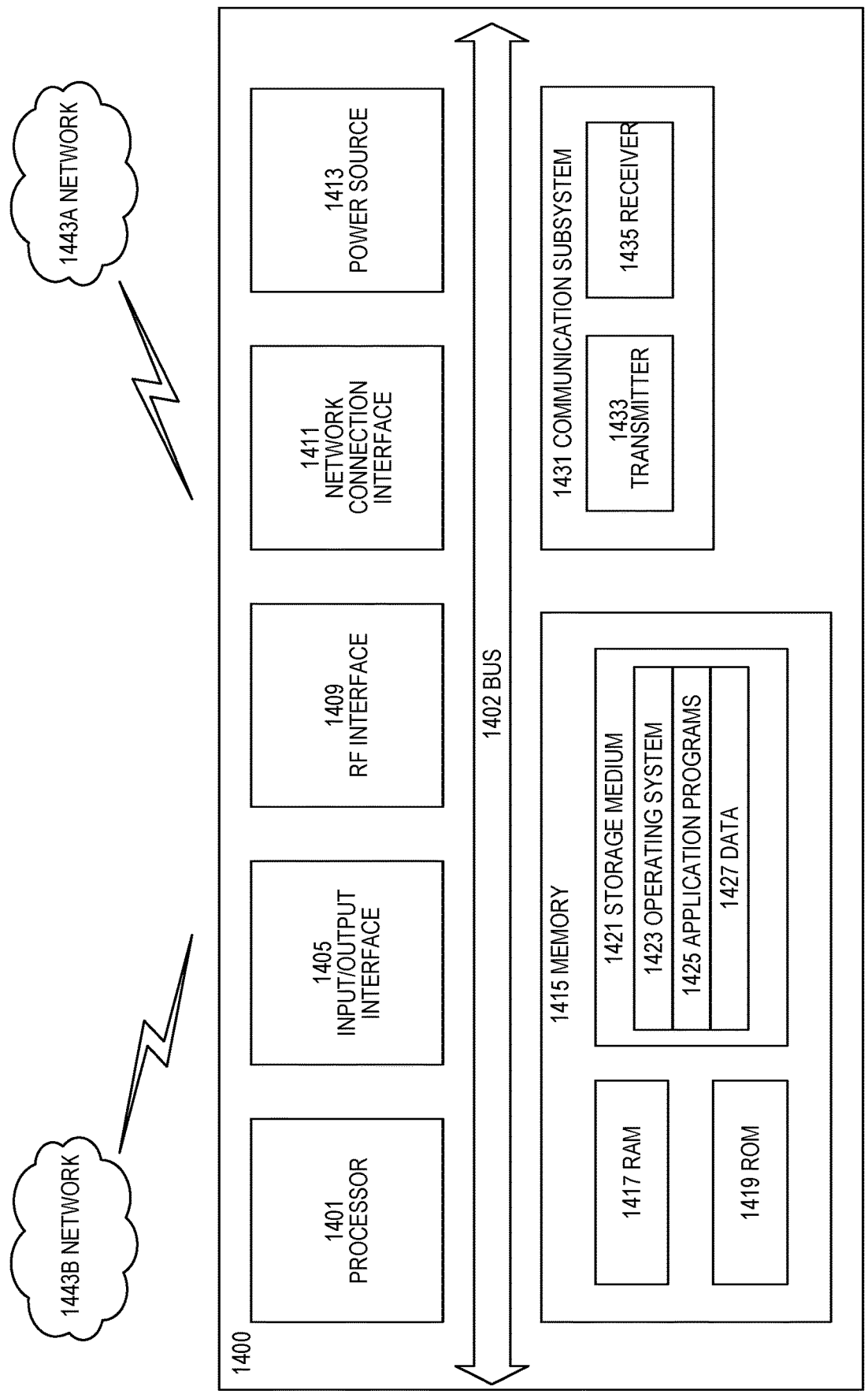
FIG. 14 illustrates an example UE in accordance with some embodiments of the presently disclosed techniques and apparatus.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1400 can be any UE identified by the 3rd Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1413, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443A. Network 1443*a* can encompass wired and/or wireless networks such as a local-area network (LAN), a wide-area network (WAN), a computer network, a wireless network, a telecommunications network, another like network or any combination thereof. For example, network 1443A can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423, application program 1425 such as a web browser application, a widget or gadget engine or another application, and data file 1427. Storage medium 1421 can store, for use by UE 1400, any of a variety of various operating systems or combinations of operating systems.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443B using communication subsystem 1431. Network 1443A and network 1443B can be the same network or networks or different network or networks. Communication subsystem 1431 can be configured to include one or more transceivers used to communicate with network 1443B. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443B can encompass wired and/or wireless networks such as a local-area network (LAN), a wide-area network (WAN), a computer network, a wireless network, a telecommunications network, another like network or any combination thereof. For example, network 1443B can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
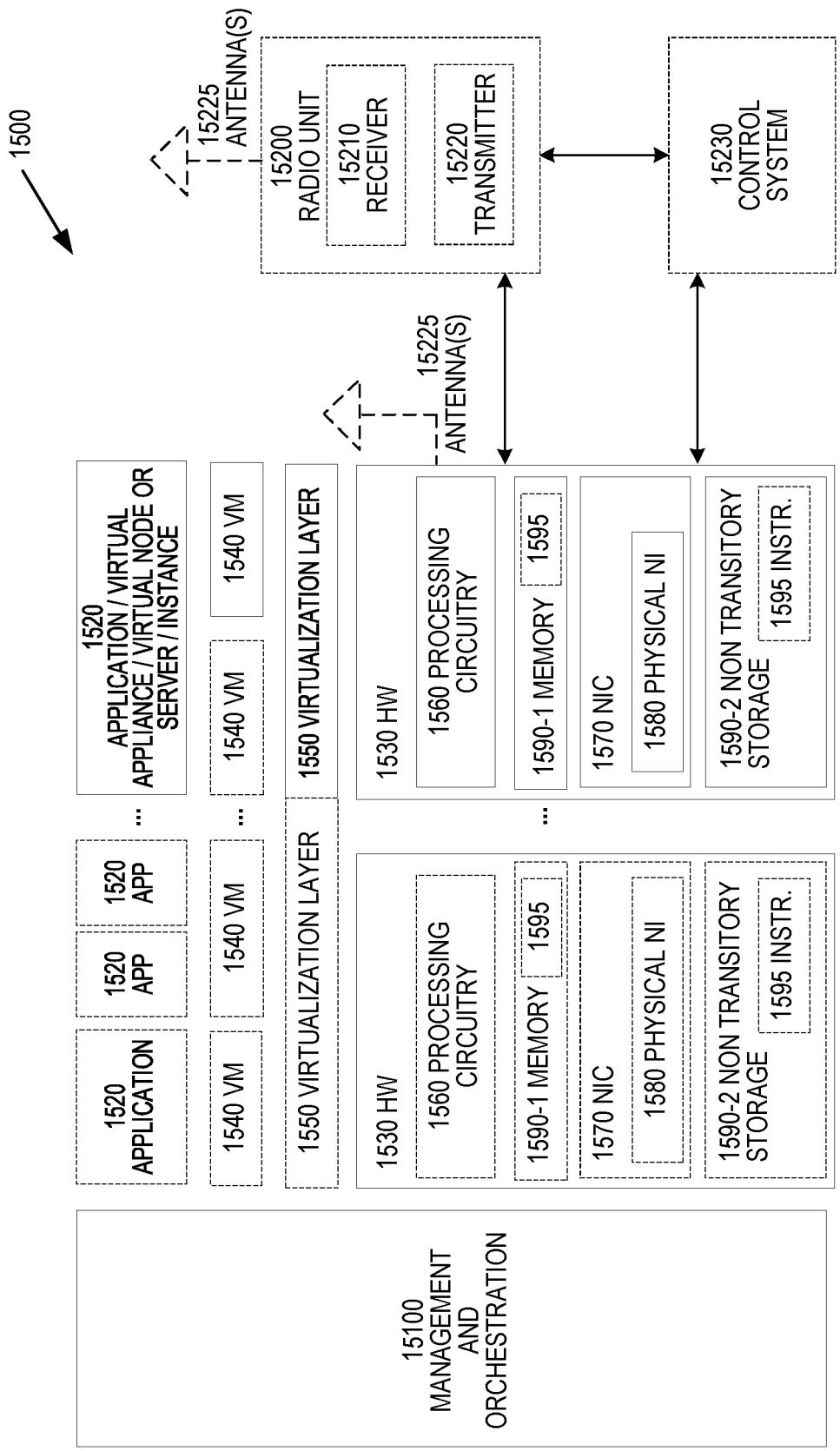
FIG. 15 is a schematic diagram illustrating a virtualization environment in which functions implemented by some embodiments can be virtualized.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 comprises general-purpose or special-purpose network hardware devices 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station.

In some embodiments, some signaling can be effected with the use of control system 15230 which can alternatively be used for communication between the hardware nodes 1530 and radio units 15200.

Figure 16:
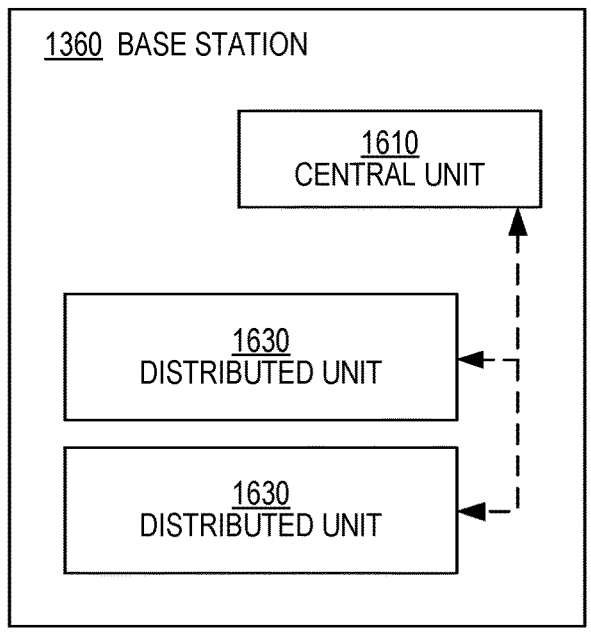
FIG. 16 shows a base station with a distributed 5G architecture.

In some exemplary embodiments, the network node 1360 in FIG. 13 is a base station comprising the distributed architecture of 5G. For example, FIG. 16 shows the base station 1360 with a central unit 1610 (e.g., gNB-CU) and at least one distributed unit 1830 (e.g., gNB-DUs).

Figure 17:
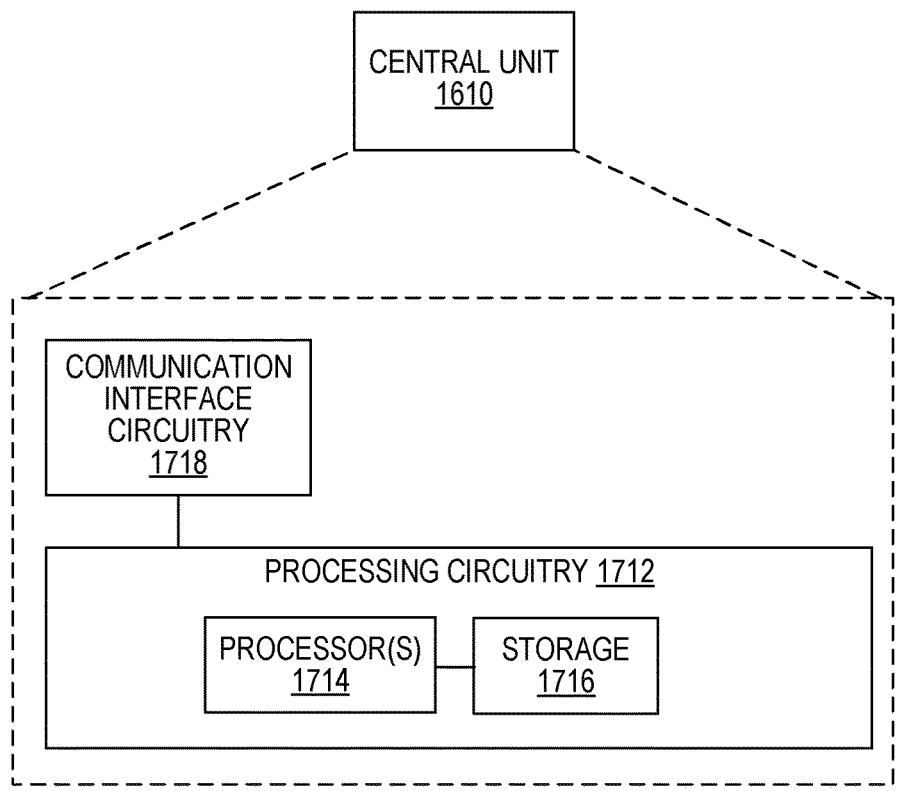
FIG. 17 illustrates an example central unit, according to some embodiments.

FIG. 17 illustrates an exemplary embodiment of a central unit 1610. The central unit 1610 may be part of a base station, e.g., as shown in FIG. 16. The central unit 1610 (e.g., gNB-CU) may be connected to and control radio access points, or distributed units (e.g., gNB-DUs). The central unit 1610 may include communication circuitry 1718 for communicating with radio access points (e.g., gNB-DUs 1630) and with other equipment in the core network (e.g., 5GC).

The central unit 1610 may include processing circuitry 1712 that is operatively associated with the communication circuitry 1718. In an example embodiment, the processing circuitry 1712 comprises one or more digital processors 1714, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 1712 may comprise fixed circuitry, or programmable circuitry that is specially configured via the execution of program instructions implementing any of the functionality described herein and ascribed to a CU.

The processing circuitry 1712 also includes or is associated with storage 1716. The storage 1716, in some embodiments, stores one or more computer programs and, optionally, configuration data. The storage 1716 provides non-transitory storage for the computer program and it may comprise one or more types of computer-readable media, such as disk storage, solid-state memory storage, or any mix thereof. By way of non-limiting example, the storage 1716 comprises any one or more of SRAM, DRAM, EEPROM, and FLASH memory.

In general, the storage 1716 comprises one or more types of computer-readable storage media providing non-transitory storage of the computer program and any configuration data used by the base station. Here, "non-transitory" means permanent, semi-permanent, or at least temporarily persistent storage and encompasses both long-term storage in non-volatile memory and storage in working memory, e.g., for program execution.

Figure 18:
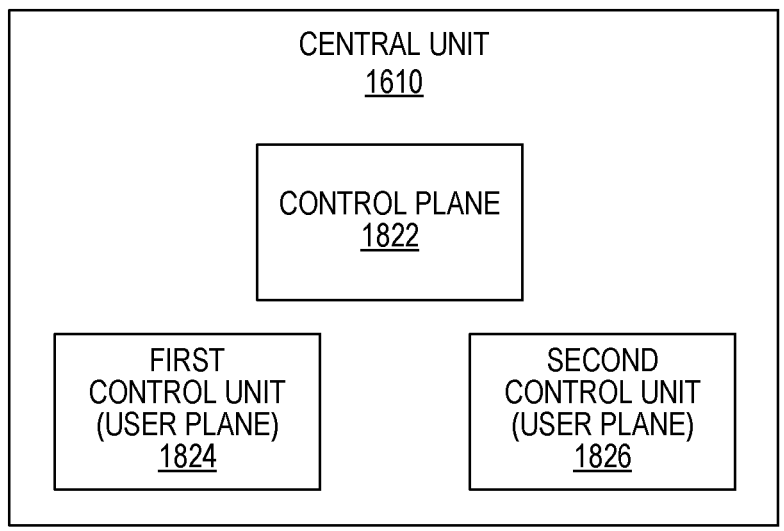
FIG. 18 illustrates an example design for a central unit.

A gNB-CU may itself be split into multiple entities. This includes gNB-CU-UPs, which serve the user plane and host the PDCP protocol, and one gNB-CU-CP, which serves the control plane and hosts the PDCP and RRC protocol. These two entities are shown as separate control units in FIG. 18, as control plane 1822 and first and second (user plane) control units 1824 and 1826. While FIG. 18 shows both the control plane 1822 and control units 1824, 1826 within central unit 1610, as if located with the same unit of a network node, in other embodiments, the control units 1824, 1826 may be located outside the unit where the control plane 1822 resides, or even in another network node. Without regard to the exact arrangement, the processing circuitry 1712 may be considered to be the processing circuitry in one or more network nodes necessary to carry out the techniques described herein for the central unit 1610, whether the processing circuitry 1712 is together in one unit or whether the processing circuitry 1712 is distributed in some fashion.

Figure 19:
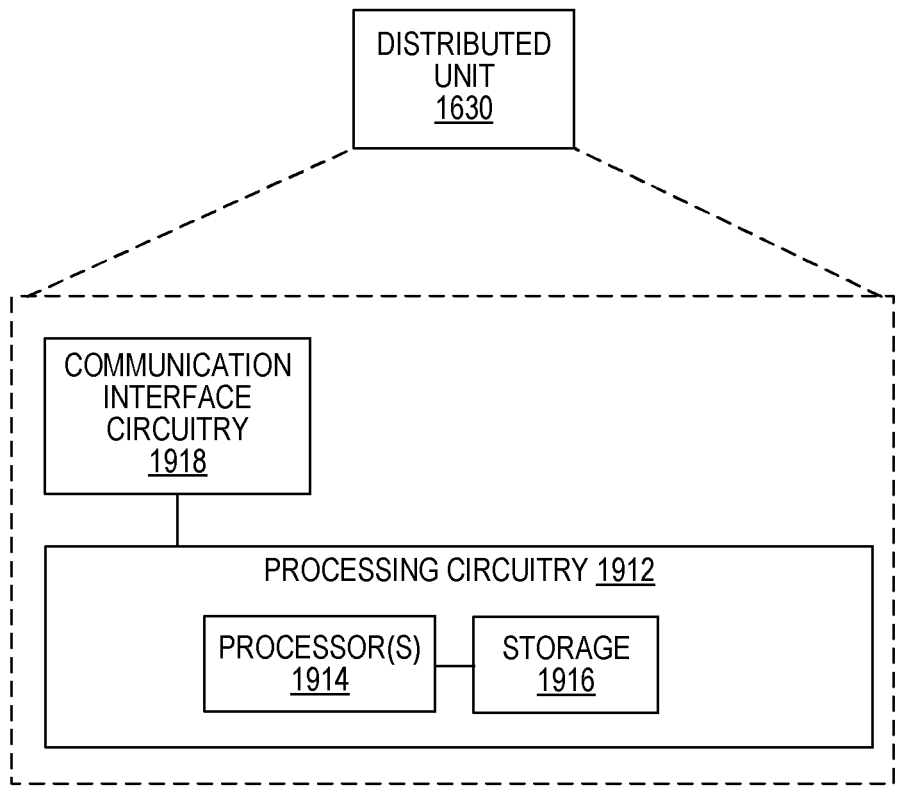
FIG. 19 illustrates an example distributed unit, according to some embodiments.

FIG. 19 illustrates an exemplary embodiment of a distributed unit (DU) 1630. The DU 1630 may be part of a base station, e.g., as shown in FIG. 16. The DU 1630 (e.g., gNB-DU) may be connected to and controlled by a CU (e.g., gNB-CU). The DU 1630 may include communication circuitry 1918 for communicating with the controlling CU (e.g., gNB-CU).

The DU 1630 may include processing circuitry 1912 that is operatively associated with the communication circuitry 1918. In an example embodiment, the processing circuitry 1912 comprises one or more digital processors 1914, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 1912 may comprise fixed circuitry, or programmable circuitry that is specially configured via the execution of program instructions implementing the functionality described herein and ascribed to a DU.

The processing circuitry 1912 also includes or is associated with storage 1916. The storage 1716, in some embodiments, stores one or more computer programs and, optionally, configuration data. The storage 1916 provides non-transitory storage for the computer program and it may comprise one or more types of computer-readable media, such as disk storage, solid-state memory storage, or any mix thereof. By way of non-limiting example, the storage 1916 comprises any one or more of SRAM, DRAM, EEPROM, and FLASH memory.

In general, the storage 1916 comprises one or more types of computer-readable storage media providing non-transitory storage of the computer program and any configuration data used by the base station. Here, "non-transitory" means permanent, semi-permanent, or at least temporarily persistent storage and encompasses both long-term storage in non-volatile memory and storage in working memory, e.g., for program execution.

Notably, modifications and other embodiments of the invention(s) disclosed will come to mind to one skilled in the art having the benefit of the teachings presented in the foregoing descriptions, the associated drawings, and the following enumerated example embodiments. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, performed by a distributed unit (DU) of a base station comprising a central unit (CU) and one or more DUs, each DU serving one or more cells, the method comprising:
   sending, to the CU, information indicative of capacity in the DU for sending segmented messages and/or indicative of a capability of the DU to send segmented messages;
   receiving, from the CU, a segmented Public Warning System (PWS) message in system information blocks (SIBs), each SIB carrying a segment of the PWS message;
   receiving, from the CU, one or more PWS segments inconsistent with a preference, requirement, capacity, or capability of the DU; and
   adapting one or more operational parameters or features of the DU to accommodate transmission of the one or more PWS segments.

2. The method of claim 1, wherein the information is indicative of capacity in the DU for sending segmented Public Warning System (PWS) messages and/or indicative of a capability of the DU to send segmented PWS messages.

3. The method of claim 1, wherein the method further comprises broadcasting the SIBs.

4. The method of claim 1, wherein said information is specific to each of two or more cells served by the DU.

5. The method of claim 1, wherein said information is specific to one of two or more network slices.

6. The method of claim 5, wherein said adapting comprises any one or more of the following:
   changing a system information (SI) window size;
   changing a bandwidth of a cell served by the DU;
   changing a sub-carrier spacing used by a cell served by the DU;
   turning on an additional cell controlled by the DU; and
   shifting time-frequency resources from another radio access technology sharing spectrum resources.

7. The method of claim 1, wherein the method further comprises:
   receiving, from the CU, one or more PWS segments inconsistent with a preference, requirement, capacity, or capability of the DU; and
   sending to the CU, in response to the one or more PWS segments, a message that includes an indication that a PWS transmission failed due to unsuitable segmentation.

8. The method of claim 1, wherein the method further comprises:
   receiving, from the CU, one or more PWS segments inconsistent with a preference, requirement, capacity, or capability of the DU;
   receiving an indication from the CU that the DU may segment PWS messages;
   resegmenting the one or more PWS segments for transmission.

9. A method, performed by a distributed unit (DU) of a base station comprising a central unit (CU) and one or more DUs, each DU serving one or more cells, the method comprising:
   sending, to the CU, at least one parameter indicating a required or recommended segmentation size for segments of messages sent to the DU;
   receiving, from the CU, a segmented Public Warning System (PWS) message in system information blocks (SIBs), each SIB carrying a segment of the PWS message;
   from the CU, one or more PWS segments inconsistent with a preference, requirement, capacity, or capability of the DU; and
   adapting one or more operational parameters or features of the DU to accommodate transmission of the one or more PWS segments.

10. The method of claim 9, wherein the at least one parameter indicates a required or recommended segment size for segments of Public Warning System (PWS) messages.

11. The method of claim 10, wherein the method further comprises broadcasting the SIBs.

12. The method of claim 9, wherein the at least one parameter indicates one or more of the following:
   a maximum segment or transport block size;
   at least one preferred segment or transport block size; and
   a minimum segment or transport block size.

13. A method, in a central unit (CU) of a base station comprising the CU and one or more distributed units, DUs, each DU serving one or more cells, the method comprising:
   receiving, from at least a first DU, information indicative of capacity in the first DU for sending segmented messages and/or indicative of a capability of the first DU to send segmented messages, and/or receiving at least one parameter indicating a required or recommended segmentation size for segments of messages sent to the first DU;

adapting a segmentation of segmented messages in response to the information and/or at least one parameter;

to at least the first DU, a segmented PWS message in system information blocks (SIBs), each SIB carrying a segment of the PWS message, for broadcast;

sending one or more PWS segments inconsistent with a preference, requirement, capacity, or capability of the DU; and adapting one or more operational parameters or features of the DU to accommodate transmission of the one or more PWS segments.

14. The method of claim 13, wherein the method comprises receiving the at least one parameter, wherein the at least one parameter indicates one or more of the following:
a maximum segment or transport block size;
a preferred segment or transport block size; and
a minimum segment or transport block size.

15. An apparatus configured to operate as a distributed unit (DU) of a base station comprising a central unit (CU) and one or more DUs, each DU serving one or more cells, the apparatus comprising:

radio circuitry configured to communicate with one or more UEs;

network interface circuitry configured to communicate with the CU; and processing circuitry operatively coupled to the radio circuitry and the network interface circuitry and configured to:

send, to the CU, at least one parameter indicating a required or recommended segmentation size for segments of messages sent to the DU;

receive, from the CU, via the network interface circuitry, a segmented Public Warning System (PWS) message in system information blocks (SIBs), each SIB carrying a segment of the PWS message;

receive, from the CU, one or more PWS segments inconsistent with a preference, requirement, capacity, or capability of the DU; and one or more operational parameters or features of the DU to accommodate transmission of the one or more PWS segments.

16. The apparatus of claim 15, wherein the at least one parameter indicates a required or recommended segment size for segments of Public Warning System (PWS) messages, and wherein the processing circuitry is further configured to broadcast the SIBs, via the radio circuitry.

17. The apparatus of claim 15, wherein the at least one parameter indicates one or more of the following:
a maximum segment or transport block size;
at least one preferred segment or transport block size; and
a minimum segment or transport block size.

* * * * *